United States Patent [19]

Maeda

[11] Patent Number: 4,830,798

[45] Date of Patent: May 16, 1989

[54] PROCESS FOR PRODUCTION OF FOAMED ARTICLES IN MOLD OF POLYPROPYLENE RESINS

[75] Inventor: Hirofumi Maeda, Takatsuki, Japan

[73] Assignee: Kanegafuchi Kagaku Kogyo Kabushiki Kaisha, Osaka, Japan

[21] Appl. No.: 96,582

[22] Filed: Sep. 15, 1987

[30] Foreign Application Priority Data

Sep. 16, 1986 [JP] Japan .................. 61-218708

[51] Int. Cl.$^4$ .................. C08J 9/18; C08J 9/22; C08J 9/12
[52] U.S. Cl. .................. 264/50; 264/53; 264/DIG. 9; 264/DIG. 16; 425/4 R; 521/134
[58] Field of Search .................. 264/50, 53, DIG. 16, 264/DIG. 9; 521/134; 425/4 R

[56] References Cited

U.S. PATENT DOCUMENTS 3,953,558 4/1976 Hatano et al. .................. 264/50 X
4,567,208 1/1986 Kuwabara et al. .................. 521/134 X
4,631,159 12/1986 Maeda et al. .................. 264/53

FOREIGN PATENT DOCUMENTS 53-3396 2/1978 Japan .

OTHER PUBLICATIONS

Muus, Laurits T.; N. Gerard McCrum; and Frank C. McGraw, "On The Relationship of Physical Properties to Structure in Linear Polymers of Ethylene and Propylene"; In *SPE Journal*, May, 1959, pp. 368–372.

*Primary Examiner*—Philip Anderson
*Attorney, Agent, or Firm*—Armstrong, Nikaido, Marmelstein, Kubovcik & Murray

[57] ABSTRACT

The present invention provides that, in a process for production of foamed articles of a polyproplene resin which comprises compressing pre-expanded beads of propylene resins under a gaseous pressure, filling a mold capable of closing but incapable of sealing with the compressed beads, then venting from the mold and heating and fusing with steam thereby to produce the molded article in the shape of the mold, the improvement wherein the pre-expanded beads of the polypropylene resins having two melting points when measured by differential scanning calorimetry and having a quantity of the peak fusion heat QH based on a melting point at a high temperature peak of the two melting points being 0.3 to 3.5 cal/g are introduced compressively into the mold so that a compressive rate is 10 to 60%. According to the present invention, the foamed articles of polypropylene having a minimized dimensional shrinkage rate (good dimensional accuracy) and excellent fusion rate and surface appearance can be produced in high productivity.

8 Claims, 3 Drawing Sheets

PROCESS FOR PRODUCTION OF FOAMED ARTICLES IN MOLD OF POLYPROPYLENE RESINS

BACKGROUND OF THE INVENTION

1. Field of the Invention

The present invention relates to a process for production of foamed articles in a mold (hereinafter referred to as "foamed articles") of polypropylene resins which are employed as thermal insulators, shock absorbing packaging materials, reusable containers, core materials for bumpers, etc.

2. Description of the Prior Art

Foamed articles of polypropylene are excellent in resistance to chemicals, resistance to heat, strain recovery after compression, etc. as compared to foamed articles of polystyrene. Further the foamed articles are also excellent in resistance to heat, compressive strength, etc. even when compared with foamed articles of polyethylene so that they have been widely used as shock absorbing packaging materials, reusable containers, core materials for bumpers, etc. To produce such foamed articles of polypropylene, there are known the following methods.

(A) Method which comprises treating pre-expanded beads of polyolefin with an inorganic gas under pressure to impregnate the heads with the inorganic gas, gradually releasing the pressure, filling the beads in a mold capable of closing but incapable of sealing while the inner pressure of the beads is kept at 1.18 atms. or more and thermally fusing with steam, etc. to prepare a molded article in the shape of the mold (U.S. Pat. No. 3,953,558).

(B) Method which comprises filling pre-expanded beads of polyolefin in a mold capable of closing but incapable of sealing, thermally fusing with steam or the like, withdrawing the molded article from the mold and, thermally curing while the volume of the molded article is 70 to 110% of the volume of the mold to prepare the molded article in the shape of the mold (U.S. Pat. No. 4,631,159).

(C) Method which comprises compressing pre-expanded beads of cross-linked polyolefin to 80% or less of an apparent bulk volume of the raw beads by gaseous pressure, filling the compressed beads in a molding mold and thermally fusing to give a molded article in the shape of the mold (Published Examined Japanese Patent Application No. 33996/1978).

However, Method (A) described above involves a defect that initial investment becomes large because installation for the compressive treatment with inorganic gas is of a large scale and Method (B) has also a defect that products having a complicated shape are inferior in visual appearance such as sink mark, surface property, etc. Further, Method (C) is not sufficiently satisfactory in surface property and dimensional accuracy.

SUMMARY OF THE INVENTION

An object of the present invention is to provide a process for production of foamed articles of polypropylene having good dimensional accuracy and having excellent fusion rate and surface property with high productivity.

Other objects and advantages of the present invention will be apparent from the following detailed description.

As a result of extensive investigations in view of such actual situations, the present inventors have found that by controlling the degree of the peak fusion heat, QH (quantity of heat determined from the peak fusion area) based on the melting point at the high temperature peak of the two melting point peaks of pre-expanded beads of propylene resin measured by the differential scanning calorimetry (hereafter referred to as DSC method) to a specific range and controlling the compressive rate of pre-expanded beads to a specific range, the problems described above could be overcome and, have accomplished the present invention.

DETAILED DESCRIPTION OF THE INVENTION

Figure 1:
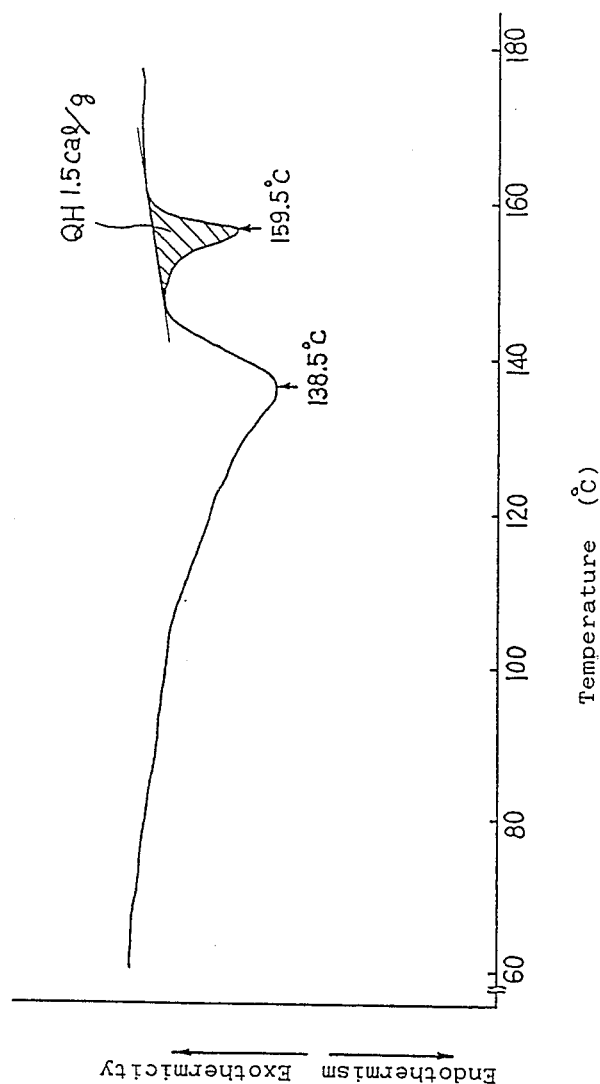
FIG. 1 shows an example of a chart of propylene resin pre-expanded beads of the present invention obtained in Example 2 measured by the DSC method, which is to explain how to determine the quantity of the peak fusion heat QH based on the melting point at the high temperature side.

In a process for production of molded articles which comprises compressing pre-expanded beads of propylene resins under a gaseous pressure, filling the compressed beads in a mold capable of closing but incapable of sealing, then venting from the mold and heating and fusing with steam thereby to produce the molded article in the shape of the mold, the present invention is directed to a process for production of foamed articles of polypropylene resins characterized in that the pre-expanded beads of the polypropylene resin has two melting points when measured by differential scanning calorimetry and having the quantity of the peak fusion heat QH based on the melting point at the high temperature peak of the two melting point peaks being 0.3 to 3.5 cal/g and the compressive rate of the pre-expanded beads immediately before the heating with steam to the original pre-expanded beads is 10 to 60%.

Examples of the propylene resins which can be used in the present invention include a propylene homopolymer, an ethylenepropylene random copolymer, an ethylene-propylene block copolymer, an ethylene-propylene-butene random copolymer, a propylene-vinyl chloride copolymer, a propylene-butene copolymer, a propylene-maleic anhydride copolymer, etc.; preferred are those prepared by stereoregular polymerization. These polymers may be used singly or in combination of two or more.

It is preferred that these propylene resins be in a noncrosslinked state but they may also be crosslinked with peroxides or radiations, etc. Further, there resins may also be used by admixture with other thermoplastic resins that can be mixed and used, for example, low density polyethylene, straight chain low density polyethylene, polystyrene, polybutene, ionomers, etc. in such a range that does not injure the properties of the propylene resins. In case that, for example, low density polyethylene, straight chain low density polyethylene, polybutene, ionomers, etc. are used in combination, 5 to 20 parts (by weight, hereafter the same) are preferred and, in the case of using polystyrene in combination, 5 to 10 parts are preferred, based on 100 parts of the propylene resin.

In order to make good use for pre-expansion, in general, these propylene resins are previously fused and subjected to fabrication in a desired shape of beads such as a cylindrical, cylindroidal, spherical, cubic, rectangular shape, etc. using an extruder, a kneader, a Banbury mixer, a roll, etc. in such a manner that the mean bead diameter of the bead be 0.1 to 10 mm, preferably 0.7 to 5 mm.

The pre-expanded beads of the present invention are preexpanded beads of propylene resins that have two melting points when measured by the DSC method, between which two melting points, the quantity of the peak fusion heat QH based on the melting point at a high temperature side is 0.3 to 3.5 cal/g, preferably 0.5 to 3.0 cal/g.

With respect to the two melting points described abobve, there is no particular restriction therebetween but it is preferred that the difference between the two melting points be 15° to 25° C. from a standpoint that the fusion upon fabrication with heating readily occurs. The difference between the two melting points is variable depending upon the molecular structure of resin, thermal hysteresis of resin, quantity of blowing agent, expansion pressure, etc., but expansion at the high temperature side increases the difference of the two melting points. Further the melting point at the low temperature side is generally in a range of 125° to 155° C. and the melting point at the high temperature side generally in a range of 145° to 175° C.; which varies depending upon the kind of propylene resins used.

To produce the propylene resin pre-expanded beads having the quantity of the peak fusion heat QH of 0.3 to 3.5 cal/g described above, there is not any particular limitation to its process; for example, there is applicable a process which comprises incorporating a volatile blowing agent into propylene resin beads in a pressure vessel, dispersing them in water with stirring, heating the dispersion to a determined expansion temperature under pressure and then discharging the aqueous dispersion into a low pressure region, or the like. The quantity of the peak fusion heat QH varies depending upon molecular structure, etc. of the resin but a high expansion temperature generally results in small QH.

When the melting point of the propylene resin beads is made TM°C. in this process, the pre-expanded beads of the present invention can be readily obtained by controlling the expansion temperature generally in a range of $(TM-4)$ to $(TM+10)$°C.

The reason why the expansion temperature is set in the range described above is because the temperature can be appropriately chosen depending upon the kind of propylene resin, amount of the blowing agent used, expansion magnification of the pre-expanded beads, etc.

Examples of the volatile blowing agent which can be incorporated into the propylene resin beads used in the present invention include aliphatic hydrocarbons such as propane, butane, pentane, hexane, etc.; alicyclic hydrocarbons such as cyclopentane, cyclobutane, etc.; halogenated hydrocarbons such as trichloromonofluoromethane, dichlorodifluoromethane, dichlorotetrafluoroethane, trichlorotrifluoroethane, methyl chloride, methylene chloride, ethyl chloride, etc. These blowing agents may be used singly or in combination of two or more. There is no limitation to its amount to be used but the blowing agent may be appropriately used depending upon the desired expansion degree of the propylene resin pre-expanded beads; in general, the amount used is 5 to 50 parts based on 100 parts of the propylene resin.

Upon preparation of the aqueous dispersion described above, there can be used as dispersing agents, for example, calcium tertiary phosphate, basic magnesium carbonate, basic zinc carbonate, calcium carbonate, etc.; a small quantity of surface active agents, for example, sodium dodecylbenzenesulfonate, sodium n-paraffin sulfonate, sodium α-olefin sulfonate, etc.

The amount of such a dispersing agent or surface active agent varies depending upon its nature, the kind of preexpanded beads and their amount used, etc. but are generally 0. 2 to 3 parts in the case of the dispersing agent and .0.001 to 0. 1 part in the case of the surface active agent, based on 100 parts of water.

Further it is preferred that the propylene resin having incorporated therein the volatile blowing agent be added generally in an amount of 20 to 100 parts to 100 parts of water, in order to improve the dispersibility in water.

The thus prepared aqueous dispersion is heated under pressure, discharged through an open orifice of 2 to 10 mmφ into a low pressure region to pre-expand the propylene resin pre-expanded beads, whereby the propylene resin pre-expanded beads of the present invention are obtained.

The aqueous dispersion described above is heated to an expansion temperature in a pressure vessel under pressure as described above but the heating temperature cannot be primarily determined because it varies depending upon the kind of propylene resin used, which value of the quantity of the peak fusion heat QH of the desired propylene resin pre-expanded beads measured by the DSC method based on the melting point at the high temperature side is chosen from 0.3 to 3.5 cal/g; as described above, however, when the melting point of the used propylene resin pre-expanded beads measured by the DSC method is made TM°C., the heating temperature is chosen almost from a range of $(TM-4)$ to $(TM+10)$°C. On the other hand, the pressure is chosen mainly based on the determined expansion magnification but is generally 10 to 50 kg/cm$^2$-G.

There is no particular restriction to the pressure vessel described above but any vessel is usable as long as it can withstand the pressure and temperature described above. A specific example of such a pressure vessel includes an autoclave type pressure vessel.

Next, the DSC method in the present invention will be described below.

As devices for measurement, mention may be made of ordinary differential scanning calorimeters, for example, Model DSC-2 manufactured by Perkin-Elmer Co., Ltd., Model TAS-100 manufactured by Rigaku Denki K.K., etc.

The melting point TM°C. of the propylene resin beads and the quantity of the peak fusion heat QH of the pre-expanded beads based on the melting point at the high temperature side are measured at a temperature elevation rate of 10° C./min. using the measurement device as described above, with respect to 1 to 10 mg of the propylene resin bead samples.

Figure 2:
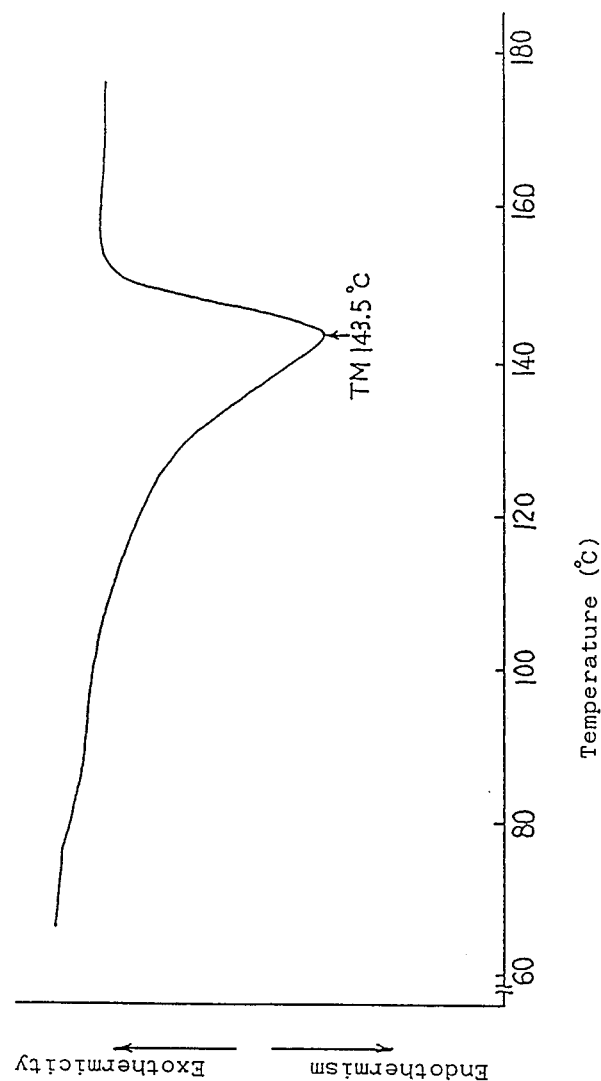
FIG. 2 is a DSC chart showing an example of measurement for the melting point TM of the propylene resin used in the present invention by the DSC method.

FIG. 2 shows an example in which TM is measured with a propylene-ethylene random copolymer having an ethylene content of 3.3 wt % as the propylene resin.

FIG. 1 indicates an example showing a method for measurement of the quantity of the peak fusion heat QH of the pre-expanded beads based on the melting point at the high temperature side, with respect to the propylene resin pre-expanded beads obtained in Example 2 using the propylene resin of FIG. 2. A straight line for determining QH is given by drawing a tangent from a point at which a gradient of a graph becomes 0 between the peak at the low temperature side and the peak at the high temperature side to the graph in which the peak at the high temperature side ends.

The quantity of the peak fusion heat QH of the propylene resin pre-expanded beads used in the present invention is in a range of 0.3 to 3.5 cal/g, preferably 0.5 to 3.0 cal/g. With less than 0.3 cal/g, dimensional shrinkage (sink mark) of the molded article becomes large. Further when QH exceeds 3.5 cal/g, surface property of the molded article becomes worse and at the same time, internal fusibility becomes worse so that the heating temperature must be raised, resulting in a long molding cycle.

The thus obtained pre-expanded beads are charged in a pressure vessel and compressed by gaseous pressure. After the pre-expanded beads are filled in a mold which can be closed but cannot be sealed, an excess of the gas is released from the mold. In this case, a compressive rate of the pre-expanded beads is in a range of 10 to 60%. Although there is no limit with regard to the method for filling the mold for molding with preexpanded beads, the following method facilitates manufacture of foamed articles high in quality with regard to the external appearance etc.

The method consists in that, with the pressure in the pressure vessel in which the pre-expanded beads are compressed being substantially equal to that in the mold for molding (under equal pressure condition), the pre-expanded beads compressed in the pressure vessel are introduced into the mold by the use of a common feeder for beads molding. When the mold is filled with the pre-expanded beads, the filling gas (normally air) ceased to flow into the mold, and excess pre-expanded beads in the feeder are returned to the pressure vessel (called "blow back"). Thus the mold is properly filled up with the compressed preexpanded beads, neither excessively nor insufficiently. After filling, the feeder's piston is closed and the excess gas in the mold is released. Then, the pre-expanded beads are heated and fused with steam to give a molded article in the shape of the mold. The molded article is withdrawn from the mold and, cured and heated in a conventional manner to give the foamed article of polypropylene.

Figure 3:
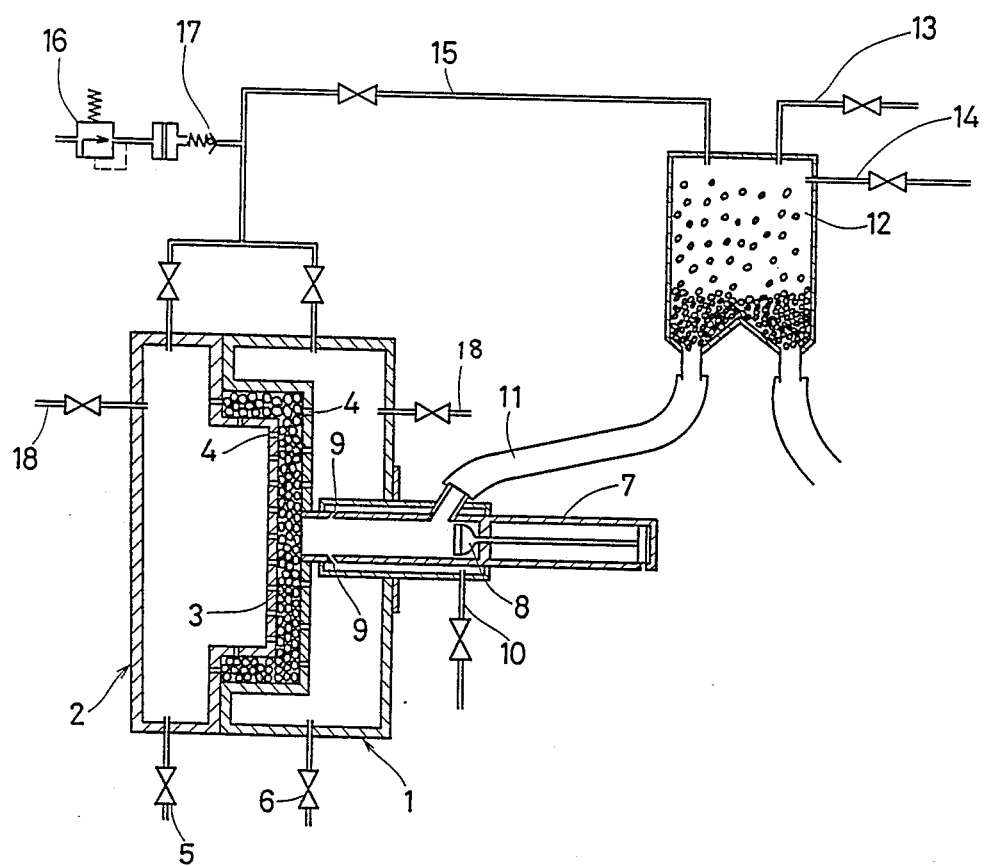
FIG. 3 is a schematic representation showing in embodiment of an apparatus used for practicing the present invention.

Then, referring to FIG. 3, described below is an embodiment of the present invention.

At first, pre-expanded beads of a propylene resin from the pre-expanded beads feeding line (14) are fed into a pressure vessel (12) and the compressed air is introduced from the pressure line (13) for the pressure in the pressure vessel (12) to rise to the predetermined level. Then, in a mold (3) consisting of a cavity (9) and a core (2) and capable of closing but incapable of sealing is filled by the aid of the feeder (7) with compressed pre-expanded beads.

The mold (3) and the pressure vessel (12) are then linked with a pressure-equalizing line (15), hence the pressures in both are kept equal, if not precisely.

The way a mold is filled with pre-expanded beads by the use of the feeder (7) is basically the same as the usual beads method of molding and, as shown in the figure, when, with a piston (8) open, the air for filling (10) is injected into the mold (3) by an air nozzle (9), the pressure in a pressure hose (11) is reduced due to the above-mentioned flow of the air for filling to be below the atmospheric level, and the pre-expanded beads start flowing into the mold (3), carried by the stream of air injected from the air nozzle (9). The mold (3) has many small holes (4) in its walls, which are permeable to air or vapor but not to the pre-expanded beads, hence the air for filling is led into the pressure equalizing line (15) through the said small holes (4). If the air pressure is above the level set by a pressure regulating valve (16), the excessive air is let out through a check valve (17) provided in the pressure equalizing line (15) so that, during filling, the pressure in the system is kept at the predetermined level. When the mold (3) is filled with the pre-expanded beads, the air for filling (10) ceases flowing and starts flowing back toward the pressure vessel (12) together with excessive pre-expanded beads. Thus, the mold is filled up properly with the pre-expanded beads, neither excessively nor insufficiently. When the mold (3) is filled with the pre-expanded beads, the piston (8) is closed, the excess is let out [usually to bring the pressure to the atmospheric level with the drain valves (5) and (6) opened], and, in the same way as used in the beads method of molding vapor is introduced into the mold (3) through a vapor line (18) for heating the pre-expanded beads, the pre-expanded beads are caused to foam and fuse together and the foamed article is taken out of the mold (3) after cooling with water from the cooling water line (now shown).

The compressive rate of the pre-expanded beads described above is determined as follows.

The compressive rate is a value obtained by dividing a weight of the pre-expanded beads of polypropylene filled in the mold described above under atmospheric pressure using a feeder as used in expanded styrol, etc. by a weight of the preexpanded beads after discharging the excess gas in the mold subsequent to the compressive filling described above and is expressed by the equation described below:

Compressive rate (%)=

$$1 - \frac{\text{Weight of pre-expanded beads upon filling under atmospheric pressure}}{\text{Weight of pre-expanded beads upon compressive filling}} \times 100$$

With less than 10% of the compressive rate described above, the surface property of the molded article becomes worse and sink mark or shrinkage tends to occur; on the other hand, when the compressive rate exceeds 60%, internal fusion becomes worse so that a molding cycle is prolonged and at the same time, pressure strength of a molding machine, a mold, etc., becomes greater, which is not economical.

Next, the present invention will be described in more detail by referring to the examples, comparative examples and reference examples but is not deemed to be limited to these examples.

EXAMPLES 1 TO 13, COMPARATIVE EXAMPLES 1 TO 8 AND REFERENCE EXAMPLES 1 AND 2

In a pressure vessel were charged 100 parts of ethylenepropylene random copolymer (manufactured by Sumitomo Chemical Co., Ltd.; "NOBLEN", ethylene content of 3.3 wt %) pellets (one bead weight of approximately 1.8 mg, melting point TM of 143.5° C. by the DSC method), 20 to 35 parts of dichlorodifluoromethane, 1.5 parts of powdery basic calcium tertiary phosphate and 0.006 parts of sodium n-paraffin sulfonate as dispersing agents together with 300 parts of water followed by heating to predetermined temperatures, respectively. The pressure in the vessel in this case was approximately 17 to 30 kg/cm$^2$-G. While maintaining the pressure in the vessel to 17 to 31 kg/cm$^2$-G while compressing dichlorodifluoromethane, a valve located at the lower part of the pressure vessel was opened and the aqueous dispersion was discharged through an orifice plate having an opening diameter of 4 mm $\phi$ under atmospheric pressure to perform pre-expansion, whereby pre-expanded beads having an expansion magnification of 9.5 to 50 times were obtained.

The thus obtained pre-expanded beads each had the quantity of the peak fusion heat QH of the pre-expanded beads based on the melting point at the high temperature side measured by the DSC method, shown in Table 1. In the examples and the comparative examples, molded articles were obtained by charging the pre-expanded beads in a pressure vessel, compressing the beads under air pressure, filling in a block mold having a size of 290×270×50 mm in various compressive rates and heating under a steam pressure of approximately 6.0 to 2.10 kg/cm$^2$-G.

With respect to physical properties of the molded articles thus obtained, a fusion rate, dimensional shrinkage rate and surface appearance of each molded article were evaluated by the methods described below. The results are shown in Table 1. In Table 1, a steam pressure for the heating and a molding cycle upon the molding are also described.

In the reference examples, molded articles were obtained by charging the pre-expanded beads in a pressure vessel, compressing the beads by air of 70° C.×9 kg/cm$^2$-G for 120 minutes to impart the internal pressure to the pre-expanded beads, withdrawing the beads under atmospheric pressure, filling in the mold described above and heating with a steam under approximately 3.5 and 2.0 kg/cm$^2$-G. Physical properties, etc. are shown in Table 1.

For reference, internal pressures of the beads immediately before the filling into the mold are also given in the table.

Fusion rate:
After making a crack having a depth of approximately 5 mm on the surface of the molded article with a knife, the molded article is broken along with the crack, the rupture crosssection is observed and a rate of the number of the broken beads to the total number of the beads is determined
◎: fusion rate of 80% or more
○: fusion rate of 60 to less than 80%
Δ: fusion rate of 50 to less than 60%
X: fusion rate of less than 50%
A standard fusion rate satisfactory for the molded article is generally at least 60%.

Dimensional shrinkage rate:
A size of the molded article is measured with a vernier caliper and a shrinkage rate is calculated based on the size of its mold.
◎: shrinkage rate of less than 2%
○: shrinkage rate of 2 to less than 3%
Δ: shrinkage rate of 3 to less than 5%
X: shrinkage rate of 5% or more Surface appearance:
The molded articles are evaluated based on the following measures:
○: Unevenness is not observed on the surface and gaps between the beads are hardly observed.
Δ: Unevenness is not observed on the surface but gaps between the beads are somewhat remarkable.
X: Unevenness is observed on the surface and gaps between the beads are extremely large.

TABLE 1

| | Forming Magnification of Pre-expanded beads | Peak Calory Fused at High Temperature QH(cal/g) | Compression Rate (%) | Maximum Heating Steam Pressure (kg/cm - G) | Molding Cycle (second) | Magnification of Molded Article (time) | Dimensional Compression Rate | Fusion Rate | Surface Appearance |
|---|---|---|---|---|---|---|---|---|---|
| Example | | | | | | | | | |
| 1 | 9.5 | 3.3 | 30 | 5.5 | 3'15" | 9.5 | ○ | ◎ | ○ |
| 2 | 9.5 | 2.0 | 30 | 5.5 | 3'10" | 10.0 | ○ | ◎ | ○ |
| 3 | 9.5 | 0.5 | 30 | 5.5 | 3'00" | 10.5 | ◎ | ◎ | ○ |
| 4 | 9.5 | 2.0 | 10 | 3.0 | 2'55" | 13.8 | Δ | ◎ | ○ |
| 5 | 9.5 | 2.0 | 40 | 6.0 | 3'20" | 8.9 | ◎ | ◎ | ○ |
| 6 | 19.0 | 3.3 | 40 | 3.5 | 3'05" | 15.8 | ◎ | ○ | ○ |
| 7 | 19.0 | 2.1 | 40 | 3.5 | 2'55" | 16.0 | ◎ | ◎ | ○ |
| 8 | 19.0 | 0.4 | 40 | 3.5 | 2'50" | 16.1 | ○ | ◎ | ○ |
| 9 | 19.0 | 2.1 | 20 | 3.0 | 2'40" | 21.2 | ○ | ○ | ○ |
| 10 | 19.0 | 2.1 | 60 | 6.0 | 3'10" | 11.0 | ◎ | ○ | Δ |
| 11 | 28.0 | 2.1 | 40 | 3.0 | 2'40" | 23.4 | ◎ | ◎ | ○ |
| 12 | 38.0 | 2.2 | 40 | 3.0 | 2'30" | 31.0 | ○ | ◎ | ○ |
| 13 | 50.0 | 2.2 | 40 | 3.0 | 2'15" | 45.0 | ○ | ◎ | ○ |
| Comparative Example | | | | | | | | | |
| 1 | 9.5 | 3.7 | 30 | 6.0 | 3'30" | 9.2 | ◎ | Δ | X |
| 2 | 9.5 | 0.2 | 30 | 6.0 | 3'10" | 9.4 | X | ○ | ○ |
| 3 | 9.5 | 2.0 | 5 | 2.0 | 3'10" | 12.5 | X | X | ○ |
| 4 | 9.5 | 2.0 | 62 | 6.0 | 4'00" | 5.0 | ◎ | X | ○ |
| 5 | 19.0 | 3.6 | 40 | 4.0 | 3'20" | 15.9 | ◎ | Δ | Δ |
| 6 | 19.0 | 0.2 | 40 | 4.0 | 3'00" | 15.8 | X | ○ | ○ |
| 7 | 19.0 | 2.1 | 5 | 2.0 | 2'30" | 24.4 | X | ◎ | ○ |
| 8 | 19.0 | 2.1 | 70 | 6.0 | 3'35" | 8.0 | ○ | X | ○ |
| Reference Example | | | | | | | | | |
| 1 | 9.5 | 2.0 | 1.5 (inner | 3.5 | 4'00" | 13.5 | ◎ | ◎ | ○ |

TABLE 1-continued

| Forming Magnification of Pre-expanded beads | Peak Calory Fused at High Temperature QH(cal/g) | Compression Rate (%) | Maximum Heating Steam Pressure (kg/cm · G) | Molding Cycle (second) | Magnification of Molded Article (time) | Dimensional Compression Rate | Fusion Rate | Surface Appearance |
| --- | --- | --- | --- | --- | --- | --- | --- | --- |
| 2 | 28.0 | 2.1 | 1.3 (inner pressure of particle) pressure of particle) | 2.0 | 3'00" | 45.0 | ○ | ◎ | ○ |

As is evident from the results shown in Table 1, the foamed article of polypropylene having a minimized dimensional shrinkage rate (good dimensional accuracy) and excellent fusion rate and surface appearance can be produced in high productivity, when the quantity of the peak fusion heat QH based on the melting point at a high temperature side measured by the DSC method is in a range of 0.3 to 3.5 cal/g and a compressive rate of the pre-expanded beads to the mold for the foaming in the mold is 10 to 60%. According to the present invention, the mold is filled with the pre-expanded beads like in the common beads method of molding, and then "blowing back" is exercised, this enabling proper filling of the mold even if its shape is highly complicated, neither excessively nor insufficiently, and the molded product is fully satisfactory also with regard to the finished appearance in the vicinity of the feeder as well as the fusibility. Further, as compared to conventional processes in which pre-expanded beads are treated under pressure to impart the internal pressure to the beads and then foamed in the mold, the process can save initial investment for installations and the molded article having a quality comparable to that of the conventional molded article can be obtained.

While the invention has been described in detail and with reference to specific embodiments thereof, it will be apparent to one skilled in the art that various changes and modifications can be made therein without departing from the spirit and scope thereof.

What is claimed is:

1. In a process for production of a foamed article of a polypropylene resin, said process comprising compressing pre-expanded beads of said polypropylene resin under a gas pressure, filling said compressed beads in a mold capable of being close but incapable of being sealed, then venting said mold, and then heating and fusing the compressed beads with steam thereby producing said molded article in the shape of said mold, the improvement wherein said pre-expanded beads have two melting points as evidenced by the presence of two peaks in a differential scanning calorimetry curve of said beads, said preexpanded bead have a peak fusion heat QH at the higher of said two melting points of 0.3 to 3.5 cal/g, and said pre-expanded beads are introduced under compression into the mold at a compression rate of 10 to 60%.

2. The process as claimed in claim 1, wherein the pressure in a pressure vessel into which the pre-expanded beads are charged is kept equal to the pressure in the mold, and said mold is filled with compressed pre-expanded beads of polypropylene resin.

3. The process as claimed in claim 1, wherein said peak fusion heat QH is 0.5 to 3.0 cal/g.

4. The process as claimed in claim 1 or 3, wherein the difference between said two melting points is 15 to 25 °C.

5. The process as claimed in claim 1, wherein said propylene resin is at least one selected from a propylene homopolymer, an ethylene-propylene random copolymer, an ethylene-propylene block copolymer, an ethylene-propylene-butene random copolymer, a propylene-vinyl chloride copolymer, a propylene-butene copolymer and a propylene-maleic anhydride copolymer.

6. The process as claimed in claim 5, wherein said propylene resin is not crosslinked.

7. The process as claimed in claim 1 or 5, wherein said propylene resin is used in admixture with another thermoplastic resin which can be mixed and used therewith.

8. The process as claimed in claim 7, wherein said thermoplastic resin is at least one selected from low density polyethylene, straight chain low density polyethylene, polystyrene, polybutene and an ionomer.

* * * * *